Figure 1:
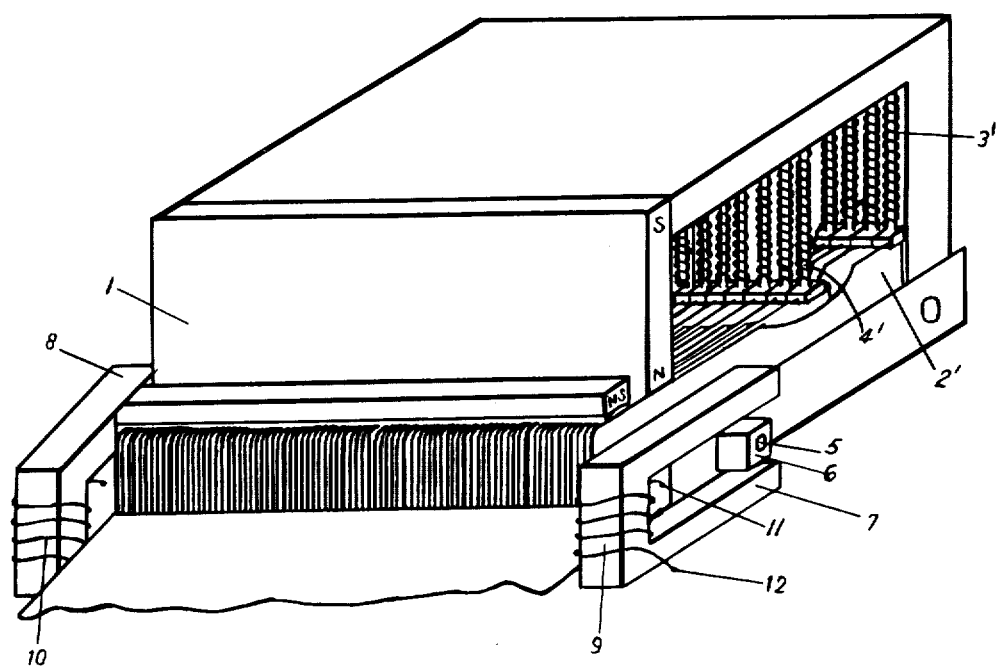

United States Patent [19]

Dirks

[11] 4,027,287
[45] May 31, 1977

[54] STORAGE-CONTROLLED OUTPUT DEVICE

[75] Inventor: Gerhard Dirks, Los Altos Hills, Calif.

[73] Assignee: Hale Bros. Associates, San Francisco, Calif.

[22] Filed: Dec. 11, 1970

[21] Appl. No.: 597,333

Related U.S. Application Data

[60] Continuation of Ser. No. 811,744, April 1, 1969, which is a division of Ser. No. 482,075, Aug. 24, 1965, Pat. No. 3,448,214, which is a division of Ser. No. 65,440, Oct. 27, 1960, Pat. No. 3,205,483, which is a division of Ser. No. 498,041, March 30, 1955, Pat. No. 2,972,016, which is a continuation-in-part of Ser. No. 101,032, June 24, 1949, abandoned.

[30] Foreign Application Priority Data

Oct. 1, 1948   Germany ............................ 11464

[52] U.S. Cl. .......................................... 340/172.5
[51] Int. Cl.² ..................... G06F 3/12; G06F 3/14
[58] Field of Search ..... 340/172.5, 324 A, 324 AD; 235/92; 315/21, 26; 178/DIG. 4; 346/110; 354/6; 445/1

[56] References Cited

UNITED STATES PATENTS

| 1,706,538 | 3/1929 | Mertz | 178/DIG. 4 |
| 2,195,098 | 3/1940 | Skellett | 315/21 |
| 2,267,827 | 12/1941 | Hubbard | 340/318 |
| 2,552,761 | 5/1951 | Baker | 177/337 |
| 2,568,336 | 9/1951 | Houghton | 315/21 |
| 2,594,731 | 4/1952 | Connolly | 340/324 AD X |
| 2,772,050 | 11/1956 | Robinson et al. | 340/172.5 X |
| 2,807,005 | 9/1957 | Weidenhammer | 340/172.5 |
| 2,920,312 | 1/1960 | Gordon et al. | 340/172.5 X |
| 2,975,228 | 3/1961 | Doty et al. | 340/172.5 X |

Primary Examiner—Harvey E. Springborn
Attorney, Agent, or Firm—Pollock, Vande Sande & Priddy

[57] ABSTRACT

A magnetic storage supplies binary input signals representing characters and a synchronizing signal. The binary input signals cause the intensity of the beam in a cathode ray tube to change from a first to a second intensity value. The beam is deflected over predetermined areas on the screen of the cathode ray tube by the synchronizing signal. If a beam of the second intensity value impinges upon a given area a visual output signal is generated.

15 Claims, 4 Drawing Figures

STORAGE-CONTROLLED OUTPUT DEVICE

CROSS-REFERENCE TO RELATED APPLICATIONS

The present application is a streamlined continuation of my application Ser. No. 811,744, filed Apr. 1, 1969, which application Ser. No. 811,744 is in turn a division of my application Ser. No. 482,075, filed Aug. 24, 1965, entitled "Storage Device", which application Ser. No. 482,075,now U.S. Pat. No. 3,448,214 is, in turn, a division of my application Ser. No. 65,440, now U.S. Pat. No. 3,205,485 (reissued as Re 26,032) filed Oct. 27, 1960 entitled "Matrix Device," which application Ser. No. 65,440, in turn, is a division of my application Ser. No. 498,041, now U.S. Pat. No. 2,972,016 filed on Mar. 30, 1955, and entitled "Teletyping and other Information," which application Ser. No. 498,041, in turn, is a continuation-in-part of my application Ser. No. 101,032, filed on June 24, 1949, entitled "Electronic Office Machin With Computing-, Indicating, Printing-, Storing- and Sorting Mechanisms," now abandoned.

The present invention relates to a means for the transmission of signals representing characters to be printed or typed or fed to some other visual display devices and consists essentially of a method and means for converting input signals in serial order to output signals in parallel order so that each line may be printed or typed as a whole even if the original signals represent parts of the line in a predetermined sequence.

The arrangement of the present invention is useful in making visible the result of a computation performed by an electronic digital computer at a high speed. The invention may be used with the computer disclosed in my copending patent application, Ser. No. 432,093, filed May 25, 1954 now abandoned, a continuation of which issued as U. S. Pat. No. 3,530,285.

The invention provides a method of printing or other indication of characters wherein signal sequences representing parts of said characters are fed by a distributor into corresponding parts of a electronic storage device, and are subsequently fed simultaneously from the parts of such storage device to printing or other indicating means.

The present invention is described as applied to a multi-denomination (i.e., multi-column) line-at-a-time high speed printer printing on the dot line principle or otherwise as described in my copending patent application, Ser. No. 432,297, filed May 25, 1954, a continuation of which has issued as U.S. Pat. No. 2,976,801, wherein each character in a line of side-by-side characters to be printed is made up of a number of rows of dots (or dashes), each row extending transversely across the sequence of characters and wherein the dots in the corresponding rows of each of the characters are printed simultaneously in the form of a single dot (or dash) line. With such a printing arrangement the character line is gradually formed by the successive printing of each dot line.

One of the main features of the operation of the invention is the use of an electronic distributor with electronic synchronizing means, and, in the case of teleprinting, the use of such distributor and synchronizer both at the transmitting and receiving ends. The distributors are preferably cathode ray distributors, the cathode ray of which is deflected in dependence on synchronizing signals on the same signal carrier as the character-representing signals.

In order that the invention may be readily carried into effect, it will now be described with reference to the accompanying drawings, wherein:

FIG. 1 is a perspective view of an embodiment of a multi-column printer for high speed printing according to the dot line principle and adapted to print in different denominations (i.e., columns) simultaneously as described in my above-mentioned patent application Ser. No. 432,297, filed May 25, 1954.

Figure 2:
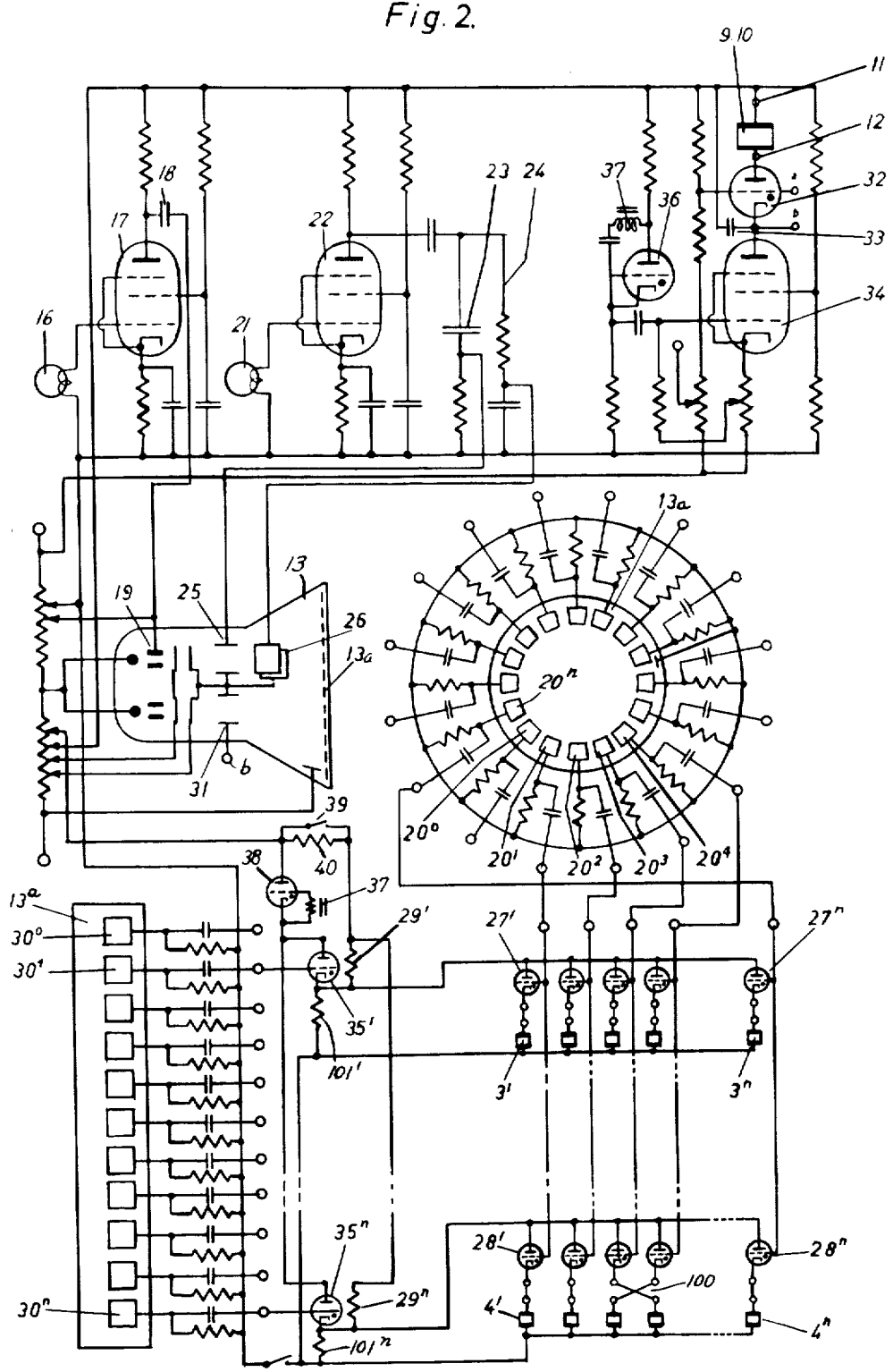
Figure 3A:
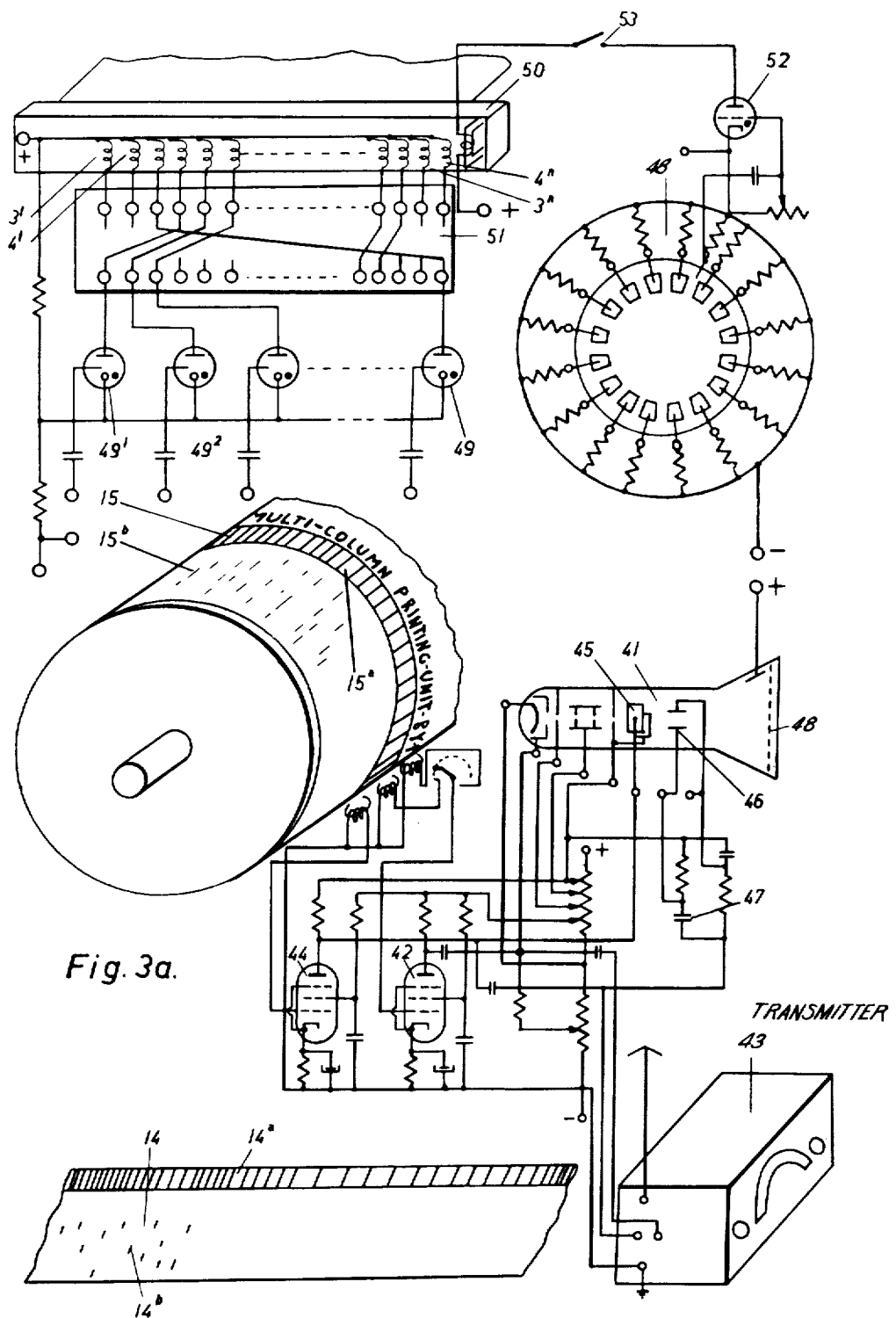
Figure 3B:
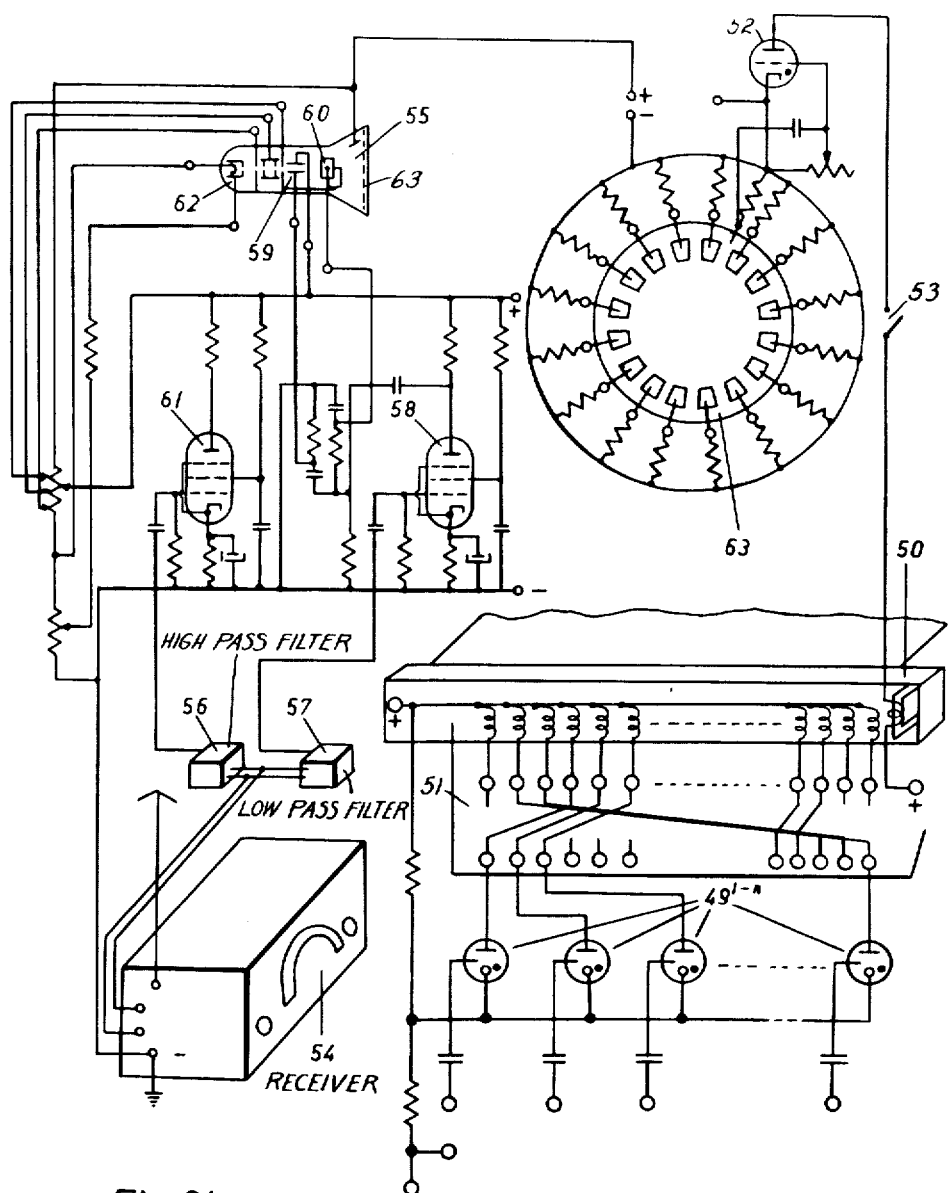

FIG. 2 is a schematic circuit diagram of an embodiment of an electronic synchronizing and distributing means for the control of a multi-denomination printing device of the type shown in FIG. 1; and FIGS. 3a and 3b are schematic circuit diagrams of embodiments of a transmitting station and a receiving station, with a dot wise operating multi-denomination printer, coordinated electronic synchronizing means in the form of cathode ray distributors, and alternative magnetic storage means in the form of a magnetizable drum and a magnetizable tape on the transmitting side (FIG. 3a).

As stated, the invention is illustrated as applied to a printing device such as described in my copending patent application, Ser. No. 432,297, filed May 25, 1954, in which characters are made up of rows of dots usually running transversely across the characters so that, with a series of side by side characters, the said transverse rows extend through all the characters, and the complete sequence of characters can be printed by the simultaneous printing of the corresponding row of dots in a single dot line, which dot lines successively develop the sequence of side-by-side characters.

The invention is equally applicable to other indications of characters, such as, for example the visual indication means disclosed in my copending patent application, Ser. No. 432,298, filed May 25, 1954 now abandoned.

As shown in FIG. 1, a permanent magnet 1 has its magnetic circuit completed via parts of the separate printing leves $2^{1-n}$ and the cores of the coils $3^{1-n}$ and $4^{1-n}$, these being arranged one behind the other as explained in the said copending patent application, Ser. No. 432,297, filed May 25, 1954, a continuation of which application Ser. No. 814,874 matured into U.S. Pat. No. 2,976,801. The main shaft 5 is moved up and down by the polarized magnetized elements 6 moving between the poles of magnets 7 and 8, which are energized according to a preferred embodiment by a current controlled by electronic tubes and flowing through the coils 9 and 10 of the magnets 7 and 8; the coil 9 having terminals 11 and 12. By energizing of the magnet coils $3^{1-n}$, $4^{1-n}$ and so on, in a selective sequence depending on the sequences of parts of characters in the transverse rows of the characters which are to be printed, the printing of the different rows, collectively forming the shapes of the different characters, can be effected at high speeds. The speed is limited by the frequency which can be reached by pivoted levers controlled by magnet coils. Under the more difficult conditions of the usual relays, involving inductive and mechanical inertia, an armature frequency of 250 cycles per second in the printing devices is easily reached. The present construction reduces the restrictive effect of the inductive and mechanical inertia of the mechanism, and makes possible the printing of at least 250 dot lines per second, equalling for example 25 type character lines per second as a maximum speed where each character is composed of 10 rows of dots. This output corresponds to 90,000 type character lines per hour, or in a multi-column printing unit of 100 denominations, a working limit of 2500 type characters per second.

The control of the energization of the printing magnet coils is effected in the example shown by the dual beam cathode ray distributor 13 of FIG. 2. The use of this relatively simple and inexpensive delay-less distributor is preferred for the present mode of high speed printing and teleprinting because it provides easy synchronization. Of course, inductive distributors or other electronic or electric distributing means may be used for the same purpose.

The printing arrangement of FIG. 1 and the cathode ray distributor of FIG. 2 operate together in the following way. The magnetic tape 14 (FIG. 3a) and the magnetic storage drum 15 (FIG. 3a) contain synchronizing signals at 14a, 15a, respectively, in addition to the signals at 14b, 15b respectively representing the different characters to be printed. In order to print the characters by dots when they are initially represented by signals in a different code, such other signal code must be converted to a suitable code for the dot line system of character representation. In such a case the selective storage 15 of FIG. 3a will be used as a converter as described in my copending patent application Ser. No, 498,055, filed Mar. 30, 1955, now U. S. Pat. No. 2,928,951. The coded character signals can be directly used for visual display as well as for printing by means of a cathode ray tube having an ordinary luminescent screen as described hereinbelow.

In the wiring diagram of FIG. 2 the pulse sequences representing the dots in the top dot line of the sequence of side-by-side type characters, which is the first row to be printed, will be sensed in sequence by a magnetic sensing head 16, one end of the winding of which is connected to the control grid of the amplifier pentode 17. The consequent variations of the plate voltage of the pentode 17 are transferred via the capacitor 18 to the negatively biased control electrode 19 associated with the upper beam (see FIG. 2) deflecting system of cathode ray tube 13.

The synchronization of the rotation of the upper cathode ray beam over the sectors $20^{0-n}$ on the screen 13a with the movement of the storage device 14 or 15 is described in my copending patent application Ser. No. 498,047, filed Mar. 30, 1955, now abandoned, a continuation of which has issued as U.S. Pat. No. 3,228,007, and my copending patent application, Ser. No. 498,048, filed Mar. 30, 1955, now U. S. Pat. 3,042,901 and is effected by means of the sensing head 21 the gap of which lies opposite the synchronization signals (14a, 15a) of the storage device. These synchronization signals are represented in FIG. 3a as magnetically recorded timing bits which are translated into electrical pulses by sensing head 21. One end of the coil of this sensing head 21 is connected to the control grid of pentode 22. After amplification this synchronization signal is applied to a phase-shifting device consisting of a bridge 23, 24. One pair of opposite arms of the bridge are resistive and the other pair of arms are capacitive. The values of the bridge arms are such that the signals at the two output junctions of the bridge have a phase difference of 90°.

The output junctions of the bridge are connected to the deflecting plate systems 25 and 26, forming part of the upper beam electrode system of the cathode ray tube.

The negative bias of the control electrode 19 of the upper beam electrode system of the cathode ray tube is such that the intensity of the cathode ray beam passing over the secondary electron emitting sectors $20^{1-n}$ of the screen 13a does not normally release a sufficient quantity of secondary electrons to produce an appreciable signal on the control grids of the thyratrons $27^{1-n}$ and $28^{1-n}$, and so on, if no pulse is sensed by head 16 and amplified by pentode 17. If such a pulse is sensed by head 16 and amplified by pentode 17, the control electrode 19 receives a positive signal for the duration of this pulse. The positive pulse is applied to control electrode 19 via capacitor 18 and increases the intensity of the upper cathode ray beam sufficiently for the corresponding sector on which the beam is then impinging to release secondary electrons in sufficient quantities to ignite the gas discharge tubes 27, 28, and so on.

In the main discharge circuit of these discharge tubes are connected the control electromagnets $3^{1-n}$, $4^{1-n}$ of the printing unit. These are interconnected in any selected way, by manually pluggable connections 100.

The energization of the electromagnets 7 and 8 is controlled by the discharge tube 32, in the main discharge circuit of which the coils 9 and 10 of these electromagnets are connected. If the number of coils $3^{1-n}$, $4^{1-n}$ in the printing mechanism to be energized does not exceed the number of available sectors $20^1$ through $20^n$ in the upper beam electrode system of cathode ray tube 13, and if the number of coils associated with each of sectors $20^1$ through $20^n$ does not exceed the permissible loading on the sector, then the control signal for the control grid of discharge tube 32 can be taken directly from the secondary emitting sector 20° which provides one pulse for each rotation of the upper cathode ray beam on the screen 13a .

If, on the other hand, the number of coils $3^{1-n}$, $4^{1-n}$ which are desired to be energized exceed the number of available sectors $20^1$ through $20^n$ or if the coil load on each sector is too great the upper beam electrode system of a single dual beam cathode ray distributor could be used repeatedly within one complete printing cycle by having the other (lower, FIG. 2) beam electrode system of the distributor operate one after another of a series of discharge tubes under control of additional sectors $30^{1-n}$.

In this case, the igniting of the discharge tube 32 is effected via connection a by the top sector 30°. With every cycle of the rotation, of the upper beam of cathode ray distributor 13 over screen 13a a pulse is produced by sector 20°, effecting the ignition of the discharge tube 36. By this means the charging pentode 34 is made conductive for a short interval, although it is normally non-conductive in consequence of a negative bias applied to the control grid via the grid-leak resistance. By this means a stepwise deflection of the other (lower, FIG. 2) cathode ray beam, passing over the sectors 30° to $30^n$ is effected in such a way that during every rotation of the upper beam, the lower beam is deflected by one step.

The energization of the electromagnets 7 and 8 is controlled by the discharge tube 32, in the main discharge circuit of which the coils 9 and 10 of these electromagnets are connected.

Prior to the first rotation of the upper beam over sectors 20° through $20^n$, the lower beam passing over the sectors $30^0$ to $30^n$, is on sector $30^0$, and having a predetermined intensity, ignites the discharge tube 32, via connection a, thus discharging capacitor 33. When impinging on sector $20^0$, the upper beam effects the ignition of the discharge tube 36 via connection c. Capacitor 33 is charged by one unit, as described above, thus deflecting the lower beam by one step onto sector $30^1$ via connection b and igniting the coordinated gas discharge tube $35^1$. The gas discharge tube $35^1$ produces across its cathode resistance $101^1$ a plate voltage for the row of discharge tubes $27^{1-n}$ shown in FIG. 2 as the upper row, which is just below the ignition voltage. Therefore, only this one of the rows is prepared to be ignited, if a pulse is applied to the control grids, connected in common to each sector $20^1$ to $20^n$ of the upper beam electrode system of cathode ray distributor 13. Thus, only that one of the discharge tubes $27^{1-n}$ can be ignited, which receives a pulse from the sectors $20^1$ to $20^n$ and is in the row of said discharge tubes controlled by the sectors $30^1$ to $30^n$ by having plate voltage applied thereto.

After one rotation of the upper cathode ray beam controlled by deflecting system 25–26 of the distributor the other lower beam passes on to sector $30^2$, as a result of igniting the discharge tube 36 by the upper beam through sector 20° via connection c. Through the transformer 37 a negative pulse is applied to the grid of triode 38 to make it non-conducting and momentarily interrupt the above voltage supply to the discharge tubes $35^{1-n}$. Therefore, the discharge tube $35^1$ is extinguished, but those of the discharge tubes $27^{1-n}$ which have been ignited are maintained by current through a resistance $29^1$, which supplies a voltage a little higher than the extinguishing voltage of the discharge tubes $27^{1-n}$.

During the third rotation, of the upper beam, the second row of discharge tubes, (controlled by discharge tube $35^2$ not shown in the drawing) which correspond to discharge tubes $27^{1-n}$ will be rendered operative, and so on, so that after, for example, ten rotations of the cathode ray distributor, all the required discharge tubes will hve been rendered operative. The coordinated coils $3^{1-n}$, $4^{1-n}$ and so on will be energized to ensure that the respective printing levers $2^{1-n}$ coordinated to these coils will be effective to print.

In order to provide a substantial current pulse which is effective in the coils $3^{1-n}$ and $4^{1-n}$ the voltage of the positive pole, which, during the preparation phase described above, is only a little higher than the extinguishing voltage of the row of discharge tubes controlled tubes $35^{1-n}$ must be increased. To this end, shortly before the culmination point of the upward movement of shaft 5, the positive pole voltage is changed over by switch 39 short circuiting resistor 40 to a higher voltage, just below the ignition voltage of the discharge tubes, the change occurring during a short interval beginning shortly before and ending shortly after the said culmination point. The switch 39 can be for example a contact switch controlled by the mechanical movement of shaft 5.

Instead of the changing of the voltage from a little higher than the extinguishing voltage to a little below the ignition voltage of the discharge tubes, discharge tubes with an additional electrode can be used. Such tubes would be ignited by the ignition electrode, maintained operative by the additional electrode during the preparation cycle and operated for a short interval by the control grid and main discharge circuit between the ordinary plate and cathode. The main discharge circuit can then only be effective for the pre-ignited discharge tubes during the short interval at the respective movements when the printing levers are at their upper culminating points. The discharge tubes can either be provided with a heated cathode (thyratron) or with a cold cathode.

The matrix storage system and multi-column printing units can be used also for teleprinting according to FIGS. 3a and 3b. In this case, the printing system at the transmitting station can be the same as described above in connection with the discussion of the embodiment of FIG. 2, but is shown without the lower beam deflecting system for purposes of clarity. As stated above, a dual-beam cathode ray tube having two deflection systems as in FIG. 2 is only necessary in certain situations and according to the more general aspects of the present invention may be replaced by a single beam cathode ray tube as shown in FIGS. 3a and 3b. The intensity of the ray of the cathode ray distributor 41 is controlled by the pentode 42 which also applies the same pulses to the modulating stage of the transmitter 43. The pentode 44 transfers the synchronization signals from the storage drum 15 or the storage tape 14 to the deflecting plate systems 45 and 46 over the phase shifting bridge 47, transferring the same signals to the modulating stage of the transmitter 43. Both modulations are transmitted by the said transmitter.

The different sectors of the cathode ray distributor screen 48 effect the selective ignition of the multidenomination tubes $49^{1-n}$ controlling the multidenomination printing unit 50 with its coils $3^{1-n}$, $4^{1-n}$ (see FIG. 1) via the plug board 51. In this case, the discharge tubes $49^{1-n}$ are shown as tubes with cold cathodes. The up and down movement of the main shaft 5 (see FIG. 1), with the several printing levers, is controlled again by the cathode ray distributor 41 by means of the discharge tube 52. The extinguishing of the discharge tube 52 is effected by breaking the circuit by means of a contact 53 controlled mechanically by the moving ends of the main shaft 5.

At the receiving station a similar arrangement exists. The transfer is effected dot line per dot line via receiver 54 (FIG. 3b), the cathode ray distributor 55 and the printing unit 50. The received signal are conducted from the receiver to the filters 56 and 57 of which the filter 57 passes lower frequencies, such as the synchronizing signals, whereas the filter 56 passes higher frequencies, such as the pulses representing the characters to be printed.

The lower frequency passed by the filter 57 is amplified in a pentode 58 controlling, after the amplification, the deflection plate system 59 and 60, the voltages being chosen in such a way that the voltages at deflecting plate system 59 are phase-shifted by 90° compared with the voltage controlling the deflecting system 60. The amplification of the pulses by pentode 61 controls the intensity of the cathode ray in the cathode ray tube 55 according to whether or not, at the moment concerned the control electrode 62 becomes less negative than its bias. As the rotation of the cathode ray in the cathode ray distributor 41 at the transmitting station is effected by the same bit rate as controls the rotation of the cathode ray in the distributor 55, the cathode ray of the cathode ray distributor screen 48 passes at every moment of the cycle the sector in distributor 41 corresponding to the sector passed over by the cathode ray of the cathode ray distributor 55. This single synchronizing bit rate signal can be taken from a storage drum or a storage tape or from a synchronizing generator which produces two alternating currents, the voltages of which are relatively shifted by 90 degrees by an off-set arrangement of their windings. The printing can likewise be effective by the multi-column unit 50 via the ignition of the control discharge tubes $49^{1-n}$ which are connected to the different sectors of the cathode ray distributor screen 63.

The movement of the main shaft, corresponding to main shaft 5 of FIG. 1, is controlled by an arrangement similar to magnetic systems 7 and 8 of FIG. 1.

Any suitable data synchronizing system may be utilized to control the printing levers or the like instead of the combination of the cathode ray distributor and discharge tubes or the like. A suitable synchronizing system will operate with great accuracy although long distances may be involved.

The pulses controlling the movement of the main shaft of the printing unit can be used also as synchronization pulses for the sawtooth control of a discharge circuit, to the capacitor of which the horizontal deflecting plates of a cathode ray tube are connected in parallel. If in this case the cathode ray tube has the ordinary luminescent screen and the pulses amplified via pentode 61 are applied to the control electrode of the cathode ray tube 55, the printing dot lines can be made visible on the screen of the cathode ray tube due to the fact that within every horizontal line the intensity of the cathode ray will be controlled in accordance with the transmitted character pulses.

By means of the plug board 51 the arrangements of the character rows on the paper sheet can be chosen simply by corresponding connections between coils $3^{1-n}$ and discharge tubes $49^{1-n}$.

The character coding device, coding the type character symbol pulses into printable or visible character pulse sequences is described in my copending patent application Serial No. 498,055, filed March 30, 1955.

What I claim is:

1. In combination with a digital computer, an output arrangement for furnishing a visual output comprising characters or symbols, each of said characters or symbols being composed of a plurality of visible indications in a predetermined space relationship to each other, comprising, in combination, data storage means for furnishing input signals comprising a synchronizing signal and, in a predetermined timed relationship therewith, a timed series of data input signals, each of said data input signals having a first and a second level, a data input signal having said second level representing an indication; cathode ray beam generating means; means for varying the intensity of said cathode ray beam to correspond to the level of said input signals, said cathode ray beam thus having a first and a second intensity level; beam-responsive means having a plurality of beam-responsive areas, each of said beam-responsive areas being adapted to assume a first or a second state in response to the intensity level of the beam when impinging thereon, a visible indication being furnished by each beam-responsive area in a second state; and deflecting means for deflecting said beam over said beam-responsive area in a predetermined sequence in response to said synchronizing signal.

2. An output arrangement as set forth in claim 1, wherein said beam-responsive means comprise a plurality of targets.

3. An output arrangement as set forth in claim 2, wherein said targets are arranged in a substantially circular pattern.

4. An output arrangement as set forth in claim 2, further comprising a plurality of storage means, each connected to one of said targets.

5. An output arrangement as set forth in claim 4, further comprising printing means, controlled by said storage means 6. An output arrangement as set forth in claim 1, wherein said beam-responsive means comprise a luminescent screen.

7. An output arrangement as set forth in claim 6, further comprising a cathode ray tube for housing said cathode ray beam generating means and said deflecting means; and wherein said deflecting means comprise the horizontal deflecting plates of said cathode ray tube.

8. An output arrangement as set forth in claim 7, further comprising a discharge circuit connected to said horizontal deflecting plate.

9. An output arrangement as set forth in claim 8, wherein said discharge circuit is a capacitor discharge circuit.

10. An output arrangement as set forth in claim 1, further comprising transmitter means for transmitting transmitter signals, said transmitter means having a modulating stage connected to said data storage means for receiving said data input signals and said synchronizing signals and creating said transmitter signals comprising two frequencies for representing binary data and synchronization; receiver means for receiving said transmitter signals, said receiver means comprising frequency responsive filter means for separating said two frequencies from each other and supplying in dependence thereon data input signals controlling said means for varying the intensity of said cathode ray and synchronizing signals for controlling said deflecting means.

11. In combination with digital computer, apparatus for providing a visual display of characters or symbols wherein each of said characters or symbols is in turn composed of a plurality of substantially identical visible indications in predetermined spaced relationship comprising, data storage means for storing coded signal sequences corresponding to said characters or symbols,
first means for furnishing synchronizing signals,
second means including said data storage means for furnishing, in predetermined relationship with said synchronizing signals, a series of discrete data input signals corresponding to said signal sequences,
each of said data input signals having a first or second level, said second level corresponding to an indication and said first level corresponding to absence of an indication,
a cathode ray tube having a cathode ray beam generating means and, in the path of a cathode ray beam produced by said generating generating means, a luminescent screen,
means coupling said second means to said cathode ray beam generating means to vary the intensity of said cathode ray beam in accordance with said data input signals, said cathode ray beam having an intensity corresponding to data input signals of said second level,
deflecting means associated with said cathode ray tube for deflecting said cathode ray beam across said luminescent screen in a predetermined fashion in response to said synchronizing signals.

whereby said luminescent screen produces visible indications in response to said cathode ray beams corresponding to data input signals of said second level.

12. The apparatus of claim 11 wherein said visible indications are arranged in a plurality of parallel rows and wherein said second means furnishes a timed series of data input signals for each of said rows.

13. The apparatus of claim 12 wherein said data storage means comprises a cyclic data storage means.

14. The apparatus of claim 12 wherein said data storage means comprises a cyclic magnetic data storage means.

15. The apparatus of claim 12 wherein said data storage means comprises a magnetic data storage means.

* * * * *

UNITED STATES PATENT OFFICE
CERTIFICATE OF CORRECTION

Patent No. 4,027,287    Dated May 31, 1977

Inventor(s) Gerhard Dirks

It is certified that error appears in the above-identified patent and that said Letters Patent are hereby corrected as shown below:

On page 1, in the heading, the serial number should be 97,333, as per communication of May 5, 1977 to correct this error.

In column 1, line 7, insert --now U.S. Pat. No. 3,448,214-- and delete same from line 9.

In column 1, line 21, correct spelling of "Machine".

In column 2, line 42, correct spelling of "levers".

In column 3, line 19, insert after "signals" --schematically depicted--.

In column 5, line 24, change "lower" to --(lower)--, in line 40 after "tive", insert --during the fourth rotation the third row of discharge tubes will be rendered operative,--, and in line 51, delete "To this end, shortly" and insert therefor --Shortly--.

In column 6, line 44, change "Fig. 36" to --Fig. 3b--

In column 7, line 27, delete "55".

UNITED STATES PATENT OFFICE
CERTIFICATE OF CORRECTION

Patent No. 4,027,287                    Dated May 31, 1977

Inventor(s) Gerhard Dirks

It is certified that error appears in the above-identified patent and that said Letters Patent are hereby corrected as shown below:

In column 8, line 31, delete ";"; on line 58, delete "generating", first occurrence.

In column 9, line 2, change "." to --,--.

Signed and Sealed this

First Day of November 1977

[SEAL]

Attest:

RUTH C. MASON  
Attesting Officer

LUTRELLE F. PARKER  
Acting Commissioner of Patents and Trademarks